No. 606,676. Patented July 5, 1898.
F. MINK.
ENGRAVING MACHINE.
(Application filed May 24, 1897.)
(No Model.) 2 Sheets—Sheet 1.

Witnesses. Inventor.
Fritz Mink
By
Attorney.

No. 606,676.  
F. MINK.  
ENGRAVING MACHINE.  
(Application filed May 24, 1897.)  
Patented July 5, 1898.

(No Model.)  
2 Sheets—Sheet 2.

Witnesses.

Inventor.  
Fritz Mink  
By  
Attorney.

UNITED STATES PATENT OFFICE.

FRITZ MINK, OF PHILADELPHIA, PENNSYLVANIA, ASSIGNOR TO THE KEYSTONE WATCH CASE COMPANY, OF SAME PLACE.

ENGRAVING-MACHINE.

SPECIFICATION forming part of Letters Patent No. 606,676, dated July 5, 1898.

Application filed May 24, 1897. Serial No. 637,829. (No model.)

*To all whom it may concern:*

Be it known that I, FRITZ MINK, of the city and county of Philadelphia, State of Pennsylvania, have invented an Improvement in Engraving-Machines, of which the following is a specification.

My invention relates to engraving-machines; and it consists of certain improvements which are fully set forth in the following specification and are shown in the accompanying drawings.

More particularly, my invention relates to that class of machines in which a graver carried on a movable tool-carrier is brought in contact with the surface of the article to be engraved, which is supported upon a rotating mandrel; and it consists of improvements in the cam devices by which the movements are imparted to the tool-carrier to move it to correspond with the variations in the surface, shape, or curvature of the work, whereby the cam-faces which control these movements may be adjusted with great nicety and precision, as well as with ease and quickness, to suit the surface formation of the work.

Figure 1:
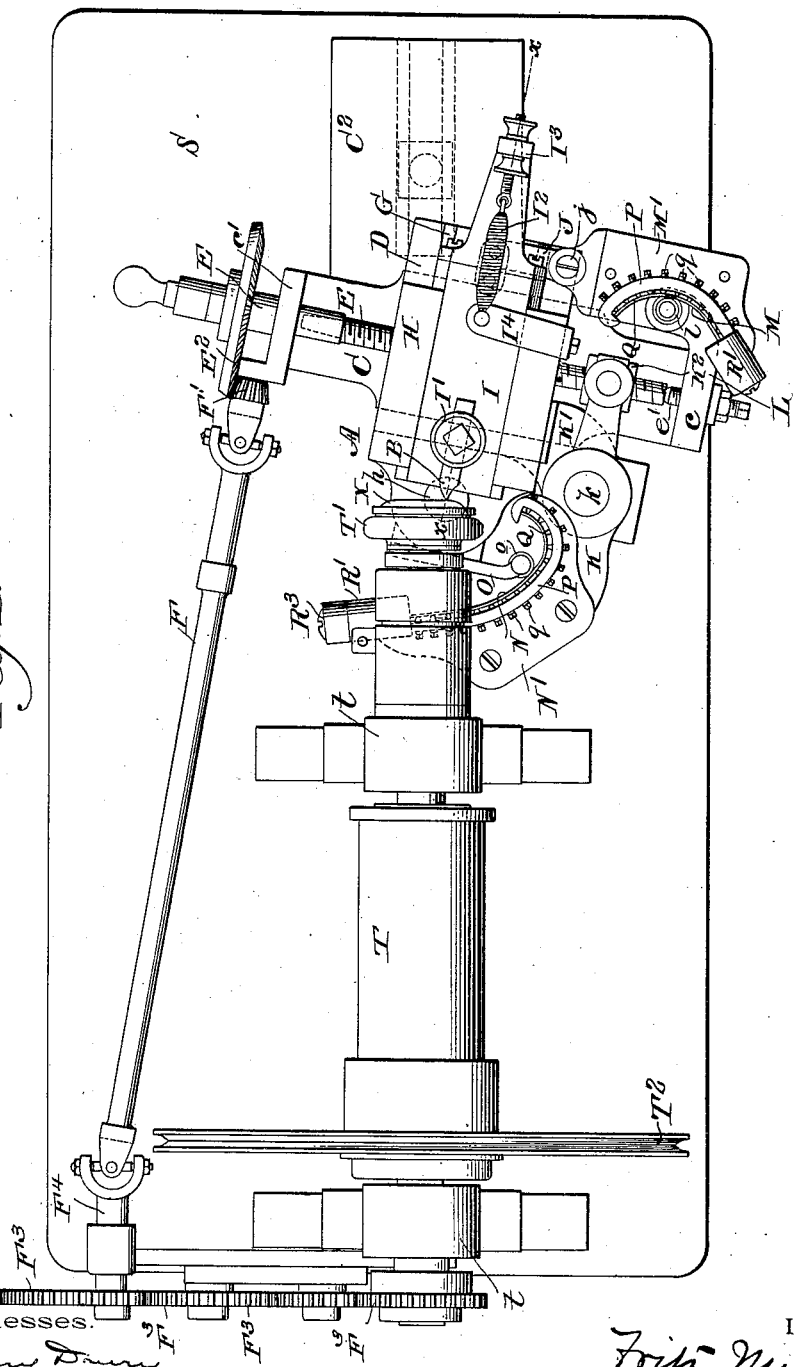
Figure 2:
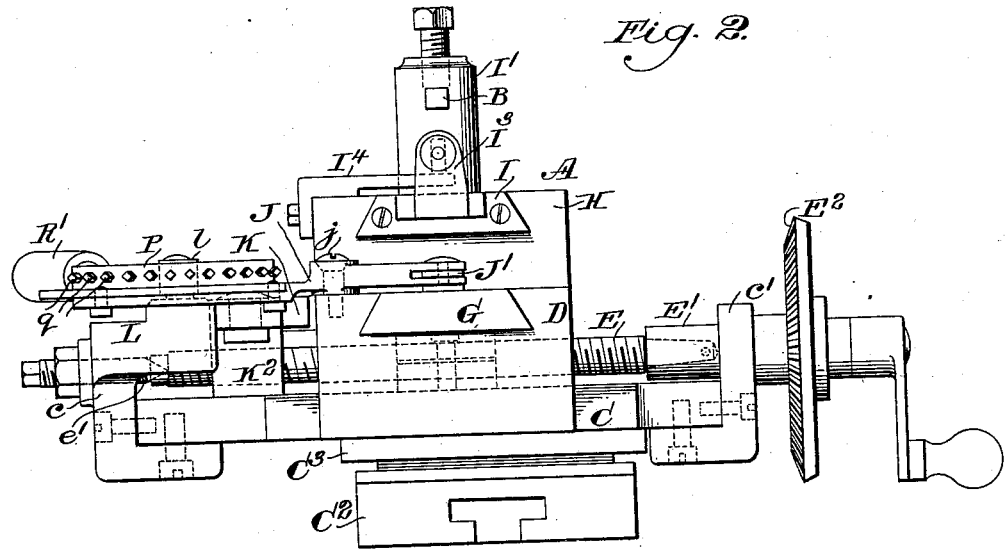
Figure 3:
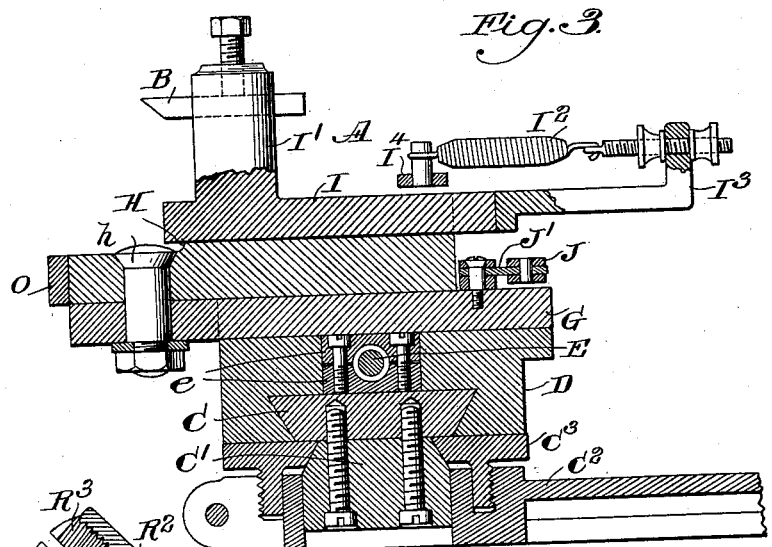
Figure 4:
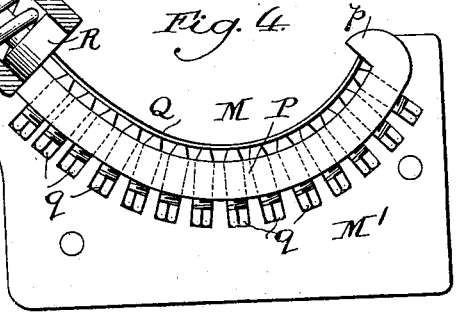

In the accompanying drawings, Figure 1 is a plan view of an engraving-machine embodying my invention. Fig. 2 is an end elevation of the graver-carriage and its connections. Fig. 3 is a longitudinal vertical sectional view of the same on the line $x\ x$ of Fig. 1 on an enlarged scale; and Fig. 4 is an enlarged plan view, with part in section, of one of the detached cams for controlling the graver-carriage.

I shall first give a general description of the machine shown in the drawings.

S is a suitable table upon which the machine is mounted.

T is the work-spindle, mounted longitudinally in suitable bearings $t$ on the table and carrying the chuck T' on its outer end. The work X, shown as a watch cover or back, is carried by the chuck T. Power is applied to the spindle T in any suitable manner, as by the band-wheel $T^2$.

A is a traversing carriage arranged in front of the chuck T and carrying the tool-carrier, upon which is mounted the graver B. The traversing carriage is constructed in parts and is so operated that it will travel laterally upon the table S, and during its movements the tool-carrier will be moved longitudinally and rocked, so that the tool or graver will always occupy the same position with reference to the portion of the surface upon which it is operating notwithstanding the variations in the surface formation, as in the curvature of a watchcase.

$C^2$ is a bed-frame located on the table S and carrying an adjustable pedestal $C^3$, shown screwed into the frame $C^2$.

D is a slide supported upon the pedestal $C^3$ and movable transversely thereon.

C' is a rotary pivot carried in the bed-frame $C^2$ and pedestal $C^3$, secured to the base of a guide C, extending transversely through the slide D and acting as the guide therefor.

E is a traversing screw engaging threaded blocks $e$ in the slide D and supported at its outer end in a center $e'$ in a bracket $c$ on one end of the guide C and connected at the other end with a shaft E' in a bracket $c'$ on the other end of the guide C. The outer end of the screw E is provided with coarser threads than the portion which acts upon the slide D for the purpose hereinafter described. In practice I have made the threads in the body portion, which operates the slide D, of an eighteen pitch and those at the outer end of a twelve pitch. This may, however, be varied. The shaft E' carries a bevel-gear $E^2$, to which power is transmitted by a bevel-pinion F', pivoted to a shaft F, which receives power from the spindle T through gears $F^3$ and shaft $F^4$, with which the shaft F is connected by a jointed coupling.

G is a slide mounted on the slide D and movable longitudinally thereon in suitable guides.

H is a carriage pivoted at the front, as at $h$, to the slide G.

I is the tool-carrier or slide mounted on the slide G and movable longitudinally thereon. It carries the tool-post I', in which the graver B is supported, and is normally held in an advanced or forward position by a spring $I^2$ between a bracket $I^3$ on the rear of the slide I and a bracket I¹, carried by the slide G. The spring I² maintains the graver pressed forward with a uniform tension on the work.

The slide D, together with the other parts of the entire carriage A, is fed transversely by the screw E, and during these movements the slide G, together with the frame H and slide I and tool B, is moved longitudinally by means of suitable cam mechanism. At the same time the frame H, together with the slide I, is rocked upon the pivot $h$ by means of other cam mechanism, and by these combined motions the graver is moved transversely over the work and at the same time is moved to and from the face of the work to correspond with the curvature thereof, and its angular position is changed so that it will always be acting at the same angle to the particular portion of the surface upon which it is operating.

My invention relates particularly to certain improvements in the cam mechanism for imparting these motions to the different parts of the tool-carriage and is fully described hereinafter. In machines of this character suitable devices may be employed for controlling the graver B and throwing it into or out of contact with the surface of the work to break the continuity of the lines of engraving or to leave portions of the surface unengraved; but as my invention is not concerned with such devices they are neither described nor illustrated.

So far as the machine has been described it is of well-known construction, and the parts shown and described may be changed or altered without departing in any way from the invention, which relates particularly to the cams for imparting the combined longitudinal and rocking motions to the tool-carrier.

J is a lever having its fulcrum at $j$ on the rear of the slide D and having one end connected by a link J' with the rear of the slide G. The other end of the lever J carries a cam M, which is acted upon by a roller $l$ on an arm L of the bracket $c$ or otherwise carried by the frame C.

K is a lever having its fulcrum at $k$ on a bracket K' of the slide D and carrying on one end an internally-threaded sleeve K², pivoted to the arm of the lever and engaging the threads of the traversing screw E, which are made of coarser pitch at the portion engaged by the sleeve K² than at the portion which operates the slide D. The other end of the lever is provided with a cam N, acted upon by a roller $o$ on an arm O, carried by the front end of the frame H.

As the slide D is moved laterally by the screw E the cam M is moved upon the roller or finger $l$, and as the finger $l$ is stationary the lever J will be rocked on the pivot $j$ and through the link J' will move the slide G in or out on the slide D, thus also moving the frame H and slide I and bringing the graver B nearer to or farther from the surface of the work to correspond with the curvature thereof. At the same time the feeding-screw E acts through the sleeve K² on the lever K, and as the threads on the portion of the screw E which acts on the sleeve K² are coarser than those acting on the slide D it will rock the lever K on its fulcrum $k$, moving the cam N upon the roller or finger $o$, and thus rocking the frame H upon its pivot $h$ and correspondingly moving the slide I and changing the angular position of the graver B. As these motions imparted by the cams M and N are designed to move the graver B, so that it will always act with the same pressure upon the work and at the same angle to the surface acted upon, it is apparent that the cams must be shaped and adjusted with great nicety, and difficulty has been experienced heretofore in accurately shaping the cams and in making this accurate adjustment. Any inaccuracy in the shape of the cams or change or variation in the curvature of the work requires a change in the cams, and heretofore it has been necessary when such changes or adjustments were made to remove the cams and grind them down or replace them by others. Making these changes occupies considerable time, during which the machine cannot be operated, and there is a consequent loss in the product of the machine. To avoid this difficulty, I construct the cams M and N, or either of them, with provision for adjustment with great accuracy and facility, so that at any time with very short interruption in the work the required adjustments may be easily made.

I shall now particularly describe the construction of the cams used by me, and as the construction of the two cams is the same I shall describe only one in detail.

The cams M and N are carried by plates M' N', adapted to be detachably connected with the levers J and K. The detached cam M is shown in Fig. 4. Upon the inner edge of the plate M' is rib P, generally corresponding with the shape of the cam-face and terminating at one end in a heel or lug $p$.

Q is a flexible metal strip extending adjacent to the rib P and having one end, adjacent to the lug $p$, loose and the other end fastened. A series of adjusting-screws $q$ are carried by the rib P and bear against the inner face of the strip Q.

I have shown the end of the strip Q fastened to a plug R in a socket R' on the plate M'. A spring R² within the socket R' bears upon the plug R.

R³ is a plug screwed into the end of the socket R' and bearing on the spring R², by means of which the tension of the spring may be adjusted.

The strip Q may be adjusted by means of the adjusting-screws $q$, and the end of the strip being carried by a yielding support R will yield when the strip is adjusted. As there are a large number of adjusting-screws $q$ which are independently adjustable, the strip may be adjusted with great nicety, the flexibility of the strip permitting it to bend.

The details of construction shown may be varied without departing from the invention.

What I claim as new, and desire to secure by Letters Patent, is as follows:

1. The combination with the movable tool-carrier of an engraving-machine, of mechanism for imparting movements to the tool-carrier, embracing a cam, having an adjustable cam-face, yieldingly supported at one end, and adjusting devices for independently adjusting the cam-face at different points in its length.

2. The combination with the tool-carrier of an engraving-machine, of mechanism for imparting movements thereto, embracing a cam having a flexible cam-face yieldingly supported at one end, and means for bending the flexible face.

3. The combination with the tool-carrier of an engraving-machine, of mechanism for imparting movements thereto, embracing a cam having a flexible cam-face yieldingly supported at one end, and means for bending the flexible cam-face consisting of a series of independent adjusting-screws bearing upon the flexible cam-face.

4. The combination with the tool-carrier of an engraving-machine, of mechanism for imparting movements thereto, embracing a cam composed of a flexible strip Q yieldingly supported at one end and a series of independent adjusting-screws $q$ bearing upon the rear of the strip.

5. The combination with the tool-carrier of an engraving-machine, of mechanism for imparting movements thereto, embracing a cam composed of a flexible strip Q, a spring-pressed plug R carrying the strip at one end and forming a yielding support therefor, and a series of adjusting-screws $q$ bearing upon the rear of the strip.

6. In an engraving-machine, the combination of a traversing carriage, a tool-carrier carried thereby, means for moving the tool-carrier longitudinally as the carriage travels, a cam for operating said means for moving the tool-carrier longitudinally, means for rocking the tool-carrier as the carriage travels, a rocking cam for operating said means for rocking the tool-carriage, and means for rocking said cam when the traversing carriage moves.

In testimony of which invention I hereunto set my hand.

FRITZ MINK.

Witnesses:
W. H. HENDERSON, Jr.,
F. H. KAIN.